(No Model.) 4 Sheets—Sheet 1.

W. C. FOSTER & H. W. MERRITT.

TRICYCLE.

No. 399,190. Patented Mar. 5, 1889.

WITNESSES.
Frank G. Parker
Matthew M. Blint

INVENTORS.
William C. Foster
Henry W. Merritt (No Model.) 4 Sheets—Sheet 2.

W. C. FOSTER & H. W. MERRITT.
TRICYCLE.

No. 399,190. Patented Mar. 5, 1889.

WITNESSES.
Frank S. Parker
Matthew M. Blunt

INVENTORS.
William C. Foster
Henry W. Merritt (No Model.) 4 Sheets—Sheet 3.

W. C. FOSTER & H. W. MERRITT.
TRICYCLE.

No. 399,190. Patented Mar. 5, 1889.

WITNESSES.
Frank S. Parker
Matthew M. Blunt

INVENTORS
William C. Foster
Henry W. Merritt (No Model.) 4 Sheets—Sheet 4.
W. C. FOSTER & H. W. MERRITT.
TRICYCLE.
No. 399,190. Patented Mar. 5, 1889.
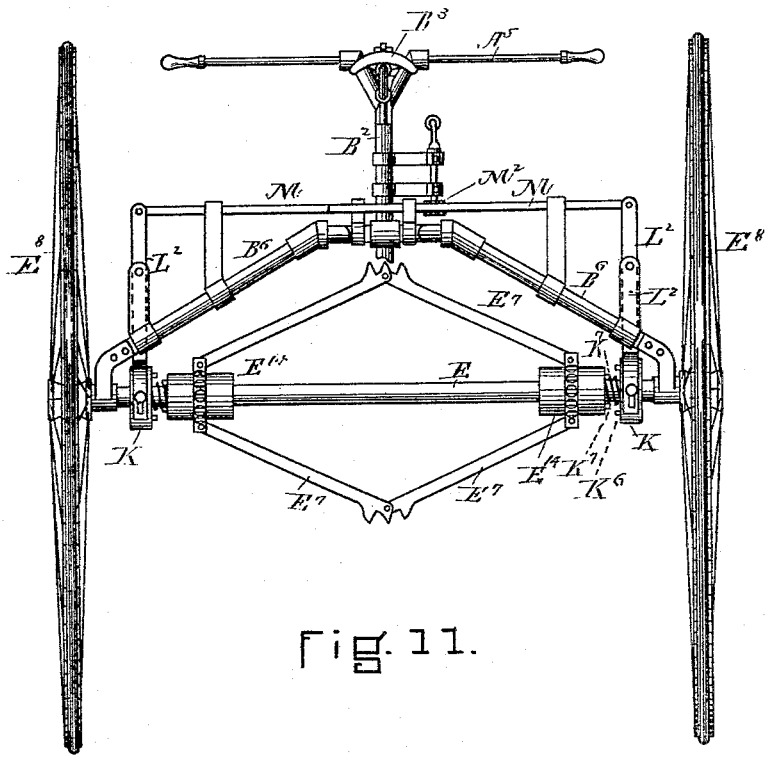
Fig. 11.
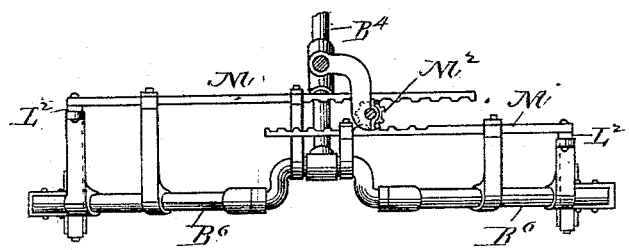
WITNESSES. Fig. 12. INVENTORS.
Frank M. Parker  
Matthew M. Phunt
William C. Foster  
Henry W. Merritt

UNITED STATES PATENT OFFICE.

WILLIAM C. FOSTER AND HENRY W. MERRITT, OF SOMERVILLE, MASSACHUSETTS.

TRICYCLE.

SPECIFICATION forming part of Letters Patent No. 399,190, dated March 5, 1889.

Application filed August 29, 1888. Serial No. 284,071. (No model.)

*To all whom it may concern:*

Be it known that we, WILLIAM C. FOSTER and HENRY W. MERRITT, both of Somerville, in the county of Middlesex and State Massachusetts, have invented a new and useful Improvement in Tricycles, of which the following, taken in connection with the accompanying drawings, is a specification.

Our invention relates more particularly to that class of velocipedes known as "tricycles" or "quadricycles," the object being to so construct the driving mechanism (which consists of sprocket-wheels and a sprocket-chain) that the diameter of one of the sprocket-wheels may be changed at will, so as to give the rider an opportunity to increase or diminish his leverage. This object we attain by the mechanism shown in the accompanying drawings, in which—

Figure 1:
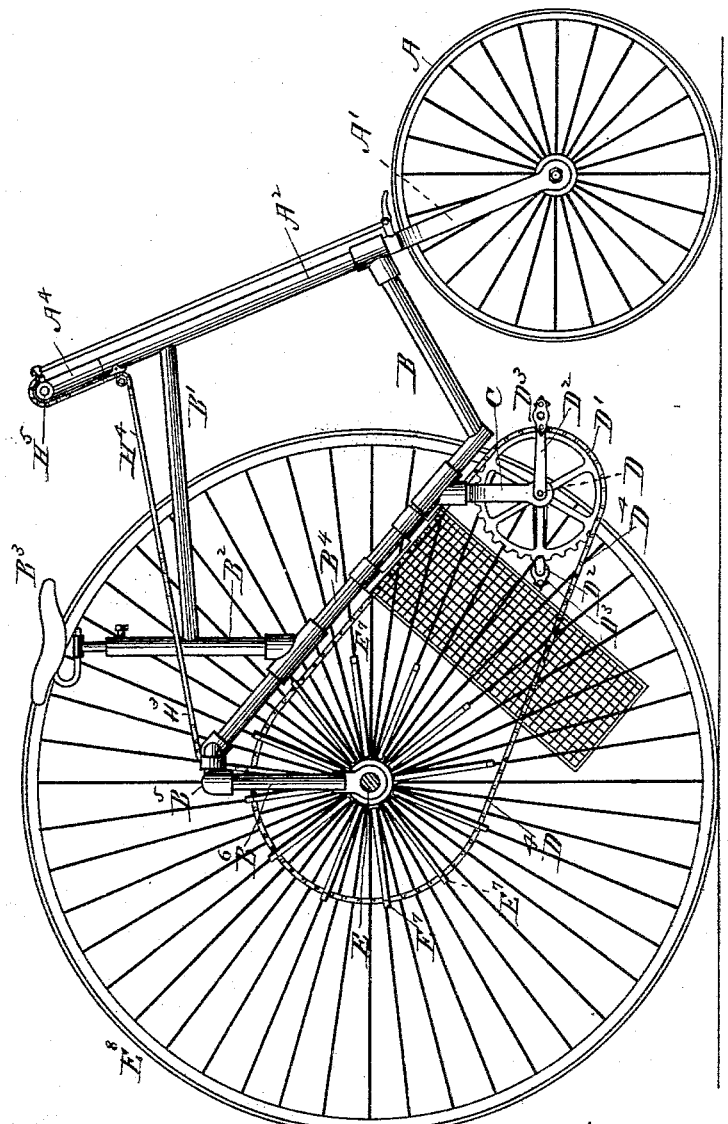
Figure 2:
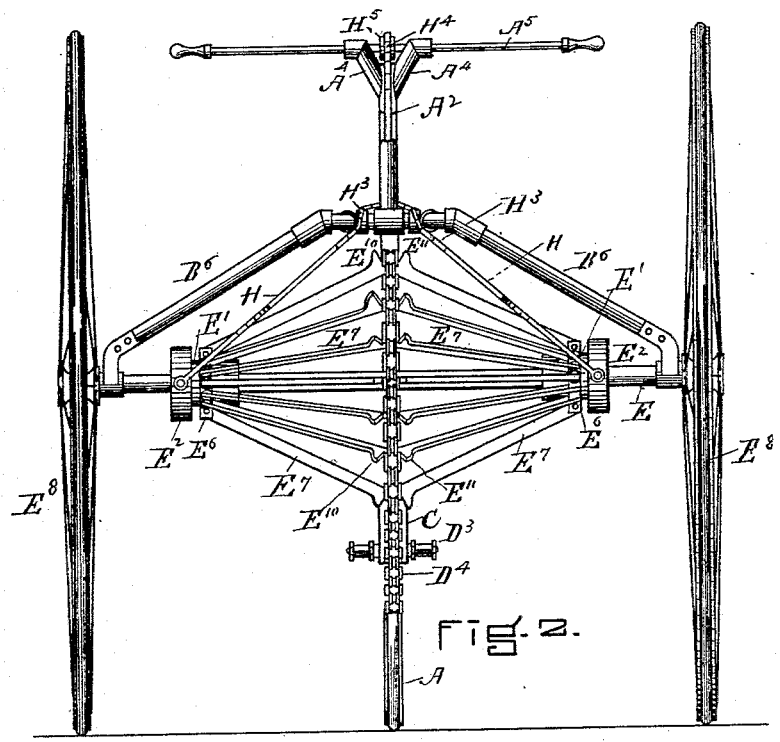
Figure 3:
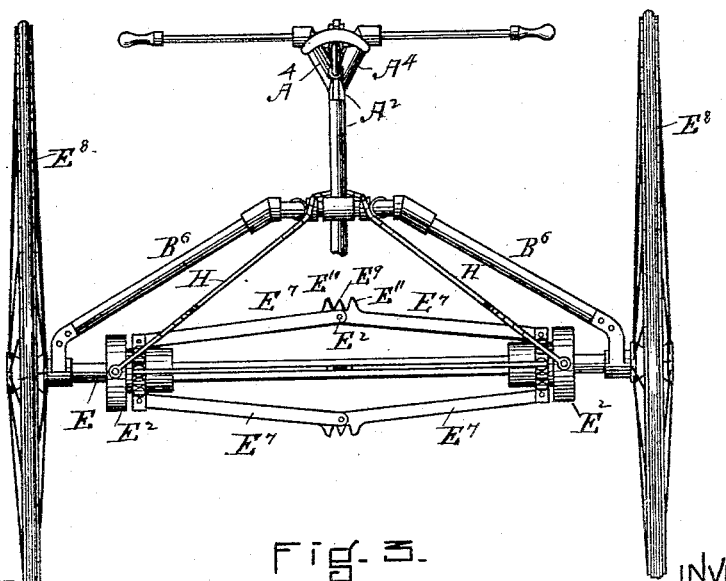
Figure 9:
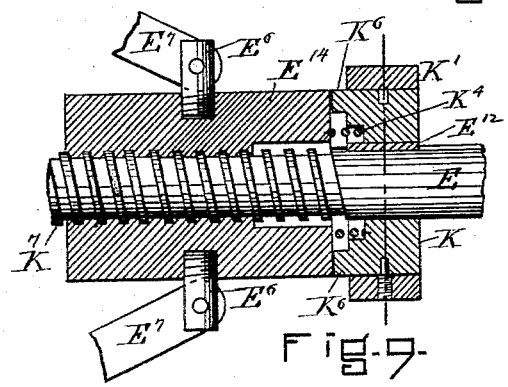
Figure 10:
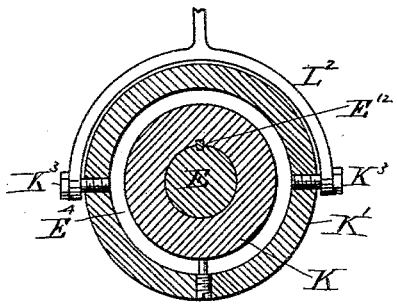

Figure 1 is an elevation of a tricycle with our invention applied, one of the large wheels being left out of the drawings for the purpose of showing the other parts more clearly. Fig. 2 is a rear elevation of a tricycle with our invention applied, the seat and a part of its standard being left off. Fig. 3 is a rear elevation of parts, showing the sprocket-wheel device in part to illustrate the method of changing the diameter. Figs. 4, 5, 6, 7, and 8 are enlarged views of details. Figs. 9 and 10 are enlarged views of modified details. Fig. 11 is a rear elevation of parts, showing a modification of my mechanism for effecting a change of diameter of the sprocket-wheel device; and Fig. 12 is a plan of portions of the parts shown in Fig. 11.

As there is nothing in the wheels and frame of our tricycle that we propose to claim, the description may be very brief.

A, Figs. 1 and 2, is the steering-wheel guided by the fork A' and standard $A^2$ $A^4$, Figs. 1, 2, and 3. This standard $A^2$ $A^4$ is connected to the other parts of the frame $B^2$ $B^4$ $B^5$ $B^6$, Fig. 1, by means of the bars B B'. The seat $B^3$ may be made in any desirable manner.

E represents the main shaft, and $E^8$ $E^8$, Figs. 1, 2, 3, and 11, the driving-wheels.

The characteristic feature of our invention is embodied in the adjustable sprocket-wheel on shaft E, Figs. 1 and 2. This sprocket-wheel has no continuous rim, but consists of a series of compound spokes, (see $E^7$ $E^7$, Figs. 1, 2, 3, and 4,) each compound spoke being in fact a toggle, the center joint of which has side guards, $E^{10}$ $E^{11}$, (see Figs. 2, 3, and 7,) and a sprocket-tooth, $E^9$, $E^2$ being the pivot that serves to connect the two parts $E^7$ $E^7$, that together form the spoke and what may be termed a "section" of the rim of the wheel. The number of these compound spokes may be varied. We have shown twelve (12.) The outer ends of the sprocket-spoke toggles are pivoted to the screw-pins $E^6$, Figs. 2, 4, and 5, as shown clearly in Fig. 5. The pins $E^6$ are made fast to a sleeve, E', which is free to slide on the shaft E, but cannot turn on the shaft, as it is provided with a spline, $E^{12}$. As the ends of each of the toggle-spokes are attached to a sleeve, E' E', (see Figs. 2 and 3,) it is evident that if the sleeves E' E' are moved on the shaft E toward each other then the central portion—that is, the portion that has the sprocket-tooth $E^9$ and the guards $E^{10}$ $E^{11}$—will be moved radially away from the shaft E, and thus increase the diameter of the sprocket-wheel, as shown in Fig. 2, and when the sleeves are moved away from each other then the diameter of the sprocket-wheel will be diminished, as shown in Fig. 3.

The sprocket chain or belt $D^4$ is shown in Figs. 1 and 2. This belt communicates motion from the pedal-wheel D', Fig. 1, to the adjustable sprocket-wheel on the main shaft E. The pedal-wheel D' is hung on a shaft, D, to the ends of which we attach the pedal-cranks $D^2$. The pedals are designated by $D^3$ $D^3$, Fig. 1.

C C are hangers, which serve to connect the shaft D of the pedal-wheel D' with the frame of the tricycle.

In Fig. 1 the sprocket-wheel device on the shaft E is shown expanded to its greatest dimension, and the sprocket-chain belt $D^4$ is represented as taut; but when the sprocket-wheel device on the shaft E is made of a smaller diameter, then the sprocket-chain belt $D^4$ will be loose, the lower part sagging.

Figure 4:
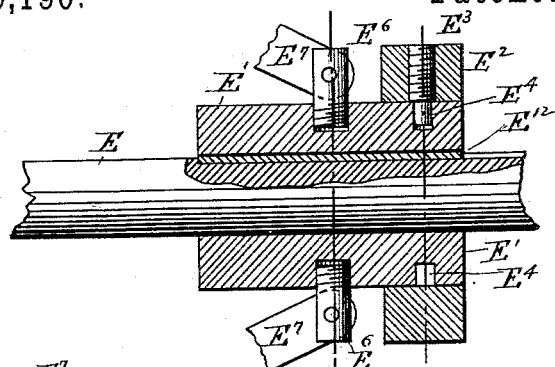
Figure 5:
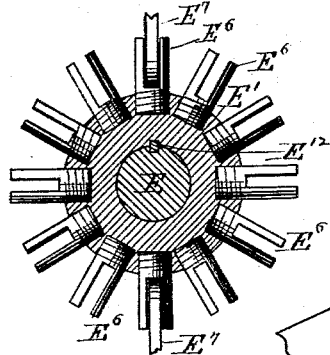
Figure 7:
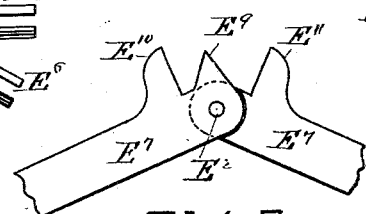

Our device for moving the sleeves E' on the shaft E—that is, drawing them together for the purpose of increasing the diameter of the sprocket-wheel device—consists of collars $E^2$ $E^2$, Figs. 2, 3, and 4, which surround the sleeves E' E', and although they cannot rotate they allow of free rotation of the sleeves E', the collars E² being connected to the sleeves E' by screw-pins, one of which, E³ is shown in Fig. 4. This pin E³ enters annular grooves E⁴, made in the sleeves E', and though it does not interfere with the rotation of the sleeves it cannot move longitudinally except as the sleeves also move.

Figure 6:
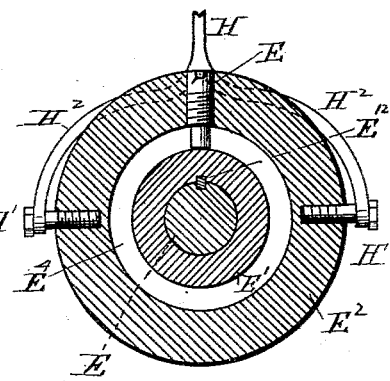
Figure 8:
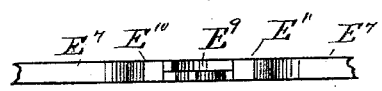

H H² H², Fig. 6, show a forked link connected by the screw-pins H' H' to the collar E, and, as shown in Fig. 2, to a chain or cord, H³. There being two of the forked links H H² H² (see Fig. 2)—that is, one for each sleeve—and two chains or cords, H³, which are joined to the single cord or chain H⁴, Fig. 2, it is plain that if the chain H³ is drawn up then the links H and H will cause the sleeves E' E' to slide on the shaft E—that is, move toward each other—which motion will cause the sprocket-wheel device on the shaft E to enlarge. By loosening the cord or chain H⁴ the collars E² and sleeves E' will slide back by the pressure of the chain belt D⁴, and the diameter of the sprocket-wheel device on the shaft E will diminish.

A convenient method of drawing up the chain or cord H⁴ is to attach its end to a small drum, H⁵, on the steering-handle A⁵. (See Fig. 2.) The upright A² is forked, as indicated at A⁴ A⁴, Fig. 2, so as to admit the drum H⁵ to occupy a central position on the handle.

By changing the diameter of the sprocket-wheel device on the shaft E we can get any required leverage that may be desired. If the rider wishes to ascend a hill, he can slack up on the cord H⁴ and through it allow the sleeves E' E' to move apart, and thus lessen the diameter of the sprocket-wheel device on the shaft E.

In Figs. 9, 10, 11, and 12 we have shown a modification of our device for moving the sleeves E¹⁴ E¹⁴ on the shaft E. In this modification the sleeve E¹⁴, Fig. 9, has an internal screw, which engages with the external screw on the shaft E. K, Fig. 9, is a clutch-sleeve having projections K⁶, which, when the clutch-sleeve K is moved against the end of the sleeve E¹⁴, will engage with the corresponding projections K⁷ (see Fig. 11) on the sleeve E¹⁴, and as the sleeve K slides on a spline, E¹², on the shaft E it is evident that the shaft E cannot turn unless it also turns the sleeve E¹⁴, and through it the sprocket-wheel device; but if the sleeve K is moved away from the sleeve E¹⁴, then the shaft E may turn independently of the sleeve E¹⁴, but at the same time, acting through the screw K⁷, Fig. 9, will cause the sleeve E¹⁴ to move longitudinally on the shaft E.

K⁴, Fig. 9, is a spring connecting the sleeves E¹⁴ and K, and being fastened to both serves to draw them into working connection, unless they are held apart by the rider.

We move the sleeve K out of connection with the sleeve E¹⁴ by the following-described device: L², Figs. 10, 11, and 12, is a forked arm connected to the collar K', Figs. 9 and 10, by means of screw-pins K³ K³, Fig. 10. The arm L² is made fast to a sliding bar, M, Figs. 11 and 12, said bar being held in place by standards L', through the upper ends of which they slide. The inner ends of these sliding bars M have gear-teeth cut upon them, as shown in Fig. 12. M², Figs. 11 and 12, represents a pinion which engages with the teeth on the slides M M, so that by turning the pinion M² one way or the other the slides are made to move in and out, and, acting through the forked arms L² and collars K', operate the sleeves K—that is, throw them into or out of clutch-connection with the sleeves E¹⁴.

As the sprocket-wheel on the shaft E is changeable in diameter, it is evident that the sprocket-teeth on the same are not always at the same distance from each other, they being nearer together when the diameter of the wheel is small and farther apart when the diameter is increased. To provide for this change of distance between the sprocket-teeth, we make the sprocket-sockets in the chain very near to each other—that is, there are several sockets for each sprocket-tooth on the wheel, so that as the chain plays around the wheel some one of the numerous sockets will engage with a sprocket-tooth.

The rider can change the diameter of the sprocket-wheel device (when using the modifications shown in Figs. 9, 10, 11, and 12) by the following-described operations: In approaching a hill he wishes to make the diameter of the sprocket-wheel device on the shaft E smaller. This he does by throwing the clutch-sleeve K out of connection with the sleeve E¹⁴, and then turning the pedal-wheel so fast as to (acting through the chain) make the sprocket-wheel on the shaft E turn faster than the shaft E, causing the sleeves E¹⁴ E¹⁴ to be screwed along on the shaft E, so as to retreat from each other, and thus cause the sprocket-wheel device to decrease in diameter, giving a greater leverage. In going down a hill, coming to a level, the opposite of this action will cause the sleeves E¹⁴ E¹⁴ to approach each other, and thus increase the diameter of the sprocket-wheel device and give greater speed.

We claim—

In a velocipede, the combination of the sprocket-wheel device on the shaft E, adapted to be increased or diminished in diameter, with the operating mechanism consisting of the sleeves E' E', collar E², forked lever H² H² H, and cord or chain H³, all operating together, substantially as described, and for the purpose set forth.

WILLIAM C. FOSTER.
HENRY W. MERRITT.

Witnesses:
FRANK G. PARKER,
MATTHEW M. BLUNT.